(12) United States Patent
Nishiyama et al.

(10) Patent No.: US 8,449,343 B2
(45) Date of Patent: May 28, 2013

(54) DISCHARGE LAMP HAVING A HEAT RESISTANT FILM AND METHOD FOR PRODUCING SAME

(75) Inventors: Yoshihide Nishiyama, Chino (JP); Noboru Sakurai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 12/686,635

(22) Filed: Jan. 13, 2010

(65) Prior Publication Data
US 2010/0213840 A1 Aug. 26, 2010

(30) Foreign Application Priority Data
Feb. 26, 2009 (JP) ................................ 2009-044252

(51) Int. Cl.
*H01J 61/35* (2006.01)
*H01J 9/24* (2006.01)

(52) U.S. Cl.
USPC ................. 445/26; 313/635; 313/637; 445/23

(58) Field of Classification Search
CPC .......... C04B 35/593; C04B 41/52; H01J 23/05
USPC 313/627–643, 567, 25, 26.3, 318.01–318.12, 313/313; 445/22, 26–27; 439/226
See application file for complete search history.

(56) References Cited

U.S. PATENT DOCUMENTS

| | | | | |
|---|---|---|---|---|
| 3,654,506 | A | * | 4/1972 | Kuhl et al. ..................... 313/641 |
| 4,522,849 | A | * | 6/1985 | Lewandowski ............... 427/237 |
| 5,668,440 | A | * | 9/1997 | Inukai et al. .................. 313/635 |
| 7,057,335 | B2 | * | 6/2006 | Emilsson et al. ............. 313/485 |
| 2003/0020407 | A1 | * | 1/2003 | Arnold et al. ................. 313/636 |
| 2004/0140753 | A1 | * | 7/2004 | Emilsson et al. ............. 313/485 |
| 2005/0062423 | A1 | * | 3/2005 | Shibahara et al. ............ 313/634 |
| 2005/0253971 | A1 | * | 11/2005 | Kim ................................ 348/744 |
| 2007/0210714 | A1 | * | 9/2007 | Kijima .......................... 313/634 |

FOREIGN PATENT DOCUMENTS

| | | |
|---|---|---|
| JP | A-50-012877 | 2/1975 |
| JP | A-2008-270074 | 11/2008 |

* cited by examiner

*Primary Examiner* — Tracie Y Green
(74) *Attorney, Agent, or Firm* — Oliff & Berridge, PLC

(57) ABSTRACT

A discharge lamp includes an arc tube and a boron oxide film formed on an inner surface of the arc tube.

2 Claims, 2 Drawing Sheets

DISCHARGE LAMP HAVING A HEAT RESISTANT FILM AND METHOD FOR PRODUCING SAME

CROSS-REFERENCE TO RELATED APPLICATION

This application is based on and claims priority from Japanese Patent Application No. 2009-044252, filed on Feb. 26, 2009, the contents of which are incorporated herein by reference.

BACKGROUND

1. Technical Field

The present invention relates to a discharge lamp, a method for producing the discharge lamp, a light source device, and a projector.

2. Related Art

Conventionally, projectors are used in a variety of application areas including image projectors for presentations in meetings and home theater systems in homes. Most of the projectors incorporate a light source device such as a discharge lamp having electrodes. For example, the discharge lamp is a halogen lamp, a metal halide lamp, or a high-pressure mercury lamp.

On the other hand, the discharge lamp causes an increase in temperature when the lamp is in its on state. Thereby, there occurs devitrification due to crystallization of quartz glass used as a material of an arc tube, resulting in a reduction in transmitted light or a decrease in strength of the arc tube itself. In order to solve the problems, for example, as in JP-A-2008-270074, an yttrium oxide ($Y_2O_3$) film is formed on an inner surface of an arc tube or a hafnium oxide ($HfO_2$) film is formed to prevent crystallization of quartz.

However, the yttrium oxide film has low transmittance and is sintered when exposed to high temperature for a long time. In addition, the hafnium oxide film tends to absorb oxygen and thus is easily oxidized, whereby devitrification can occur. Accordingly, forming only such a monolayer film is not enough to sufficiently obtain a devitrification prevention effect. Thus, further improvement is needed.

SUMMARY

An advantage of the invention is to provide a discharge lamp that prevents devitrification (crystallization) caused by heat generated upon a discharge of electricity to prevent a reduction in transmitted light and a decrease in strength of an arc tube so as to obtain long-term reliability. Additionally, other advantages of the invention are to provide a method for producing the discharge lamp, a light source device, and a projector that include the discharge lamp.

To solve the above problems, a discharge lamp according to a first aspect of the invention includes an arc tube and a boron oxide film formed on an inner surface of the arc tube.

In the discharge lamp of the first aspect, the boron oxide film is formed on the inner surface of the arc tube. The boron oxide has high translucency, as well as is extremely excellent in chemical stability and thermal resistance. Accordingly, even when the discharge lamp is exposed to high temperature when the lamp is in its on state, the boron oxide film hardly deteriorates. Thereby, devitrification of the arc tube can be effectively prevented in a long term, so that a life span of the discharge lamp can be significantly improved.

In addition, preferably, the boron oxide film is a thin film formed by sintering boron oxide particles.

In the discharge lamp above, a devitrification preventing film having an even film thickness can be formed on the inner surface of the arc tube.

Preferably, the boron oxide film has a thickness ranging from 0.1 to 100 micrometers.

In the discharge lamp above, there occur no problems, such as separation and a film crack. Thus, a high devitrification prevention effect can be maintained in the long term.

In addition, preferably, the thickness of the boron oxide film ranges from 0.2 to 50 micrometers.

The discharge lamp above can provide the long-term high devitrification prevention effect, so that the life span of the discharge lamp can be significantly improved.

In order to solve the above problems, a method for producing a discharge lamp according to a second aspect of the invention includes applying a liquid material including boron oxide on an inner surface of an arc tube and heating the applied liquid material to form a boron oxide film on the inner surface of the arc tube.

In the method of the second aspect, after applying the boron oxide film on the inner surface of the arc tube, the applied film is heated to form a devitrification preventing film. This can prevent, for example, separation of the devitrification preventing film due to a failure of adhesion of the film with the arc tube.

In addition, in the method of the second aspect, preferably, the liquid material is prepared by dispersing or dissolving particles of the boron oxide in a medium.

In the method above, the devitrification preventing film can be formed so as to have an even thickness on the inner surface of the arc tube.

A light source device according to a third aspect of the invention includes the discharge lamp of the first aspect.

The light source device of the third aspect includes the discharge lamp that has the high devitrification prevention effect and the long-term life span, thus allowing light emission with high luminance in the long term and thereby achieving high reliability.

A projector according to a fourth aspect of the invention includes the light source device of the third aspect.

The projector includes the light source device of the third aspect capable of providing light emission with high luminance in the long term, thus achieving high visibility and high definition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. Among the drawings referred to in the description below, scales of respective constituent elements vary according to needs to make the elements visually discernible.

First Embodiment

Figure 1:
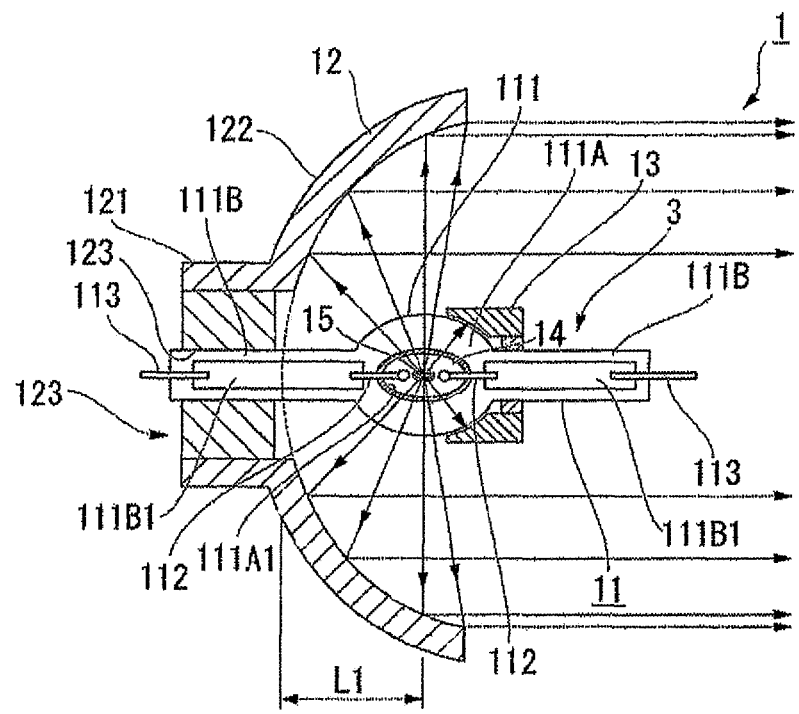
FIG. 1 is a plan view showing an entire structure of a light source device according to an embodiment of the invention.
Figure 2:
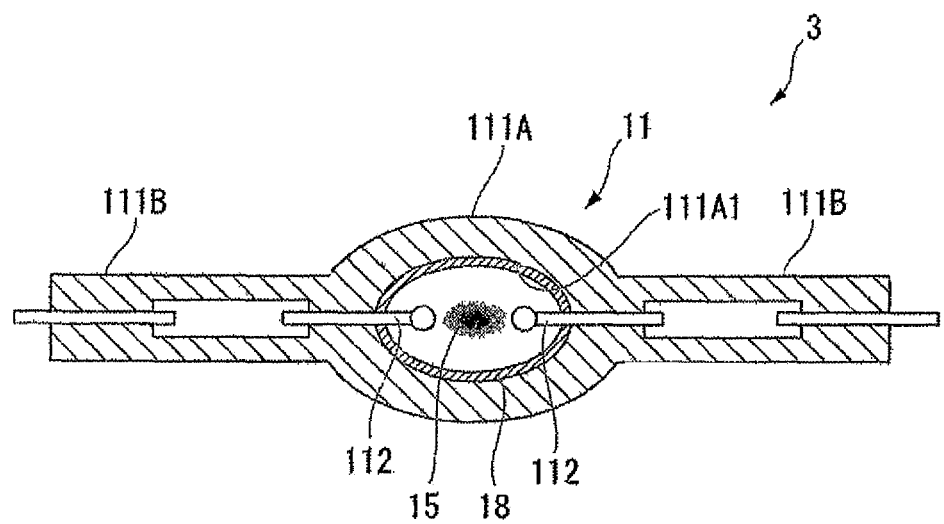
FIG. 2 is a sectional view showing a schematic view of a discharge lamp according to an embodiment of the invention.

FIG. 1 is a plan view showing an entire structure of a light source device according to an embodiment of the invention, and FIG. 2 is a sectional view showing a schematic structure of a discharge lamp according to an embodiment of the invention.

A light source device 1 of the embodiment is suitably incorporated in a projector, which will be described later. The light source device 1 includes a reflector 12 and a discharge lamp 3 of the embodiment arranged inside the reflector 12. The discharge lamp 3 includes an arc tube 11 made of quartz glass ($SiO_2$) and a pair of electrodes 112 arranged inside the arc tube 11. A light emitting substance is enclosed in the arc tube 11.

The arc tube 11 includes a bulging portion 111A as a spherically bulging center and enclosing portions 111B extended on opposite sides of the bulging portion 111A. Inside the bulging portion 111A is formed a light emission region 14 in which the light emitting substance is filled (an enclosing space where a light emission gas is enclosed). The light emission region 14 has an inner diameter of approximately 1 to 2 millimeters, for example.

In the enclosing portions 111B, bar-shaped electrodes 112 are arranged in such a manner that one-side top ends of the electrodes 112 are spaced apart from each other. The electrodes 112 are suitably made of a conductive material, particularly, a material having a small thermal expansion coefficient and a high level of thermal resistance. Specifically, tungsten is suitable.

When the top ends of the electrodes 112 are arranged in the light emission region 14 of the arc tube 11, reaction of the electrode material with the gas seems to cause corrosion of the metal material of the electrodes depending on a kind of the gas filled in the light emission region 14. In this case, it is desirable to form a corrosion resistant film or the like.

Inside the respective enclosing portions 111B, respective foils 111B1 made of molybdenum are inserted and electrically connected to the pair of respective electrodes 112. The foils 111B1 are enclosed in glass or the like. The respective foils 111B1 are connected to respective leading wires 113 as electrode leading wires. The leading wires 113 are extended outside the discharge lamp 3.

The light emitting substance filled in the light emission region 14 includes mercury, a rare gas, and a halogen compound. An amount of the mercury filled may range from 0.15 $mg/mm^3$ to 0.32 $mg/mm^3$, and is preferably enclosed at a vapor pressure of 150 to 190 bars.

The rare gas is used to promote light emission performed by a light emitting portion and is not restricted to a specific one. For example, the rare gas may be a commonly used gas such as argon gas or xenon gas.

In addition, the halogen compound may be a halogen selected among chlorine, bromine, and iodine. Among them, particularly, bromine is preferable.

As shown in FIG. 2, the arc tube 11 of the embodiment includes a devitrification preventing film 18 to prevent devitrification of the arc tube 11. The devitrification preventing film 18 is provided on an inner surface 111A1 of the bulging portion 111A.

The devitrification preventing film 18 is mainly made of boron oxide ($B_2O_3$) and covers an entire part of the inner surface 111A1 of the bulging portion 111A. The devitrification preventing film 18 is a thin film formed by sintering particles of the boron oxide and has high light transmission properties and high thermal resistance. In other words, the devitrification preventing film 18 mainly made of the boron oxide has a chemically stable structure and hardly deteriorates even when exposed to high temperature for a long time. Thus, the devitrification preventing film 18 can prevent reaction between the substance filled in the arc tube 11 and the inner surface 111A1 of the arc tube 11.

A thickness of the devitrification preventing film 18 varies with the light emitting substance or the like enclosed in the arc tube 11. For example, the devitrification preventing film 18 has a thickness preferably ranging from 0.1 to 100 micrometers, and more preferably ranging from 0.2 to 50 micrometers.

In order to form the devitrification preventing film 18 thus structured, first, a liquid material that includes boron oxide particles is dissolved or dispersed in ethanol, octanol, butyl acetate, or the like. Then, the liquid material is applied on the inner surface 111A1 of the arc tube 111 by a dipping (DIP) method and sintered at a predetermined temperature.

The reflector 12 is an integrally molded article made of glass and includes a neck-shaped portion 121 through which one of the enclosing portions 111B of the discharge lamp 3 is inserted and a reflecting portion 122 having a curved planar shape extended from the neck-shaped portion 121.

At a center of the neck-shaped portion 121 is formed an insertion hole 123, and the one of the enclosing portions 111B is arranged in a center of the insertion hole 123.

The reflecting portion 122 is formed by vapor-depositing a metal thin film on an inner surface of the glass having the curved plane. A reflecting surface of the reflecting portion 122 serves as a cold mirror reflecting visible light and transmitting infrared light therethrough.

The discharge lamp 3 is arranged inside the reflecting portion 122 in such a manner that a center of light emission between the electrodes 112 inside the bulging portion 111A is located at a focus position L1 of the curved plane of the reflecting portion 122.

As shown in FIG. 1, the reflector 12 having the curved planar shape is designed in such a manner that a flux of light emitted from the bulging portion 111A becomes parallel light when the discharge lamp 3 is turned on.

When fixing the discharge lamp 3 to the reflector 12 thus formed, the enclosing portions 111E of the discharge lamp 3 are inserted in the insertion hole 123 of the reflector 12 to fill an inorganic adhesive mainly containing silica or alumina in the insertion hole 123.

A sub reflection mirror 13 is a reflecting member that covers a front side in a light flux emission direction of the light emission region 14 of the bulging portion 111A. A reflecting surface of the sub reflection mirror 13 is formed into a concavely curved plane following a spherical surface of the light emission region 14 (the inner surface 111A1 of the arc tube 11), and serves as a cold mirror, similarly to the reflector 12.

Preferably, the sub reflection mirror 13 covers a portion ranging from approximately a half to a third of the front side in the light flux emission direction of the light emission region 14 of the bulging portion 111A.

In the discharge lamp 3 described above, when voltage is applied to the leading wires 113 extended outwardly from the enclosing portions 111B, discharge of electricity occurs between the electrodes 112, thereby causing light emission of a light emitting portion 15. Then, a part of a light flux emitted forwardly from the bulging portion 111A of the discharge lamp 3 is reflected on the reflecting surface of the sub reflection mirror 13 to be returned to the bulging portion 111A. Next, energy of a part of the returned light is absorbed by the substance enclosed in the light emission region 14 of the bulging portion 111A, whereas a remaining part of the returned light goes into the reflector 2 to be emitted from the reflecting portion 122 of the reflector 12.

As described above, the light source device 1 of the embodiment includes the devitrification preventing film 18 mainly made of boron oxide ($B_2O_3$) on the inner surface 111A of the arc tube 11. The boron oxide is excellent in translucency, chemical stability, and thermal resistance. Accordingly, even when the inner surface 111A1 of the arc tube 11 is exposed to high temperature for a long time during continuous lighting of the discharge lamp 3, the devitrification preventing film 18 does not deteriorate and thus can maintain its good film condition. This allows inhibition of reaction between the light emitting substance (a metal halogen substance) enclosed in the arc tube 11 or the electrode material (tungsten) and the arc tube 11 (quartz glass, high silica glass, or the like), thereby preventing deterioration, a color change, or devitrification occurring in the arc tube 11. As a result, the life span of the discharge lamp 3 can be significantly improved.

In addition, when forming the devitrification preventing film 18, the liquid material prepared by dispersing (dissolving) the boron oxide particles in a medium is applied on the inner surface 111A1 of the arc tube 11. Thereby, cohesion among the boron oxide particles can be prevented and thus dispersibility of the particles can be increased. Consequently, the devitrification preventing film 18 can be formed with an even film thickness on the inner surface 111A1 of the arc tube 11.

Projector

Next, a description will be given of a projector according to an embodiment of the invention. The projector includes the light source device of the embodiment.

Figure 3:
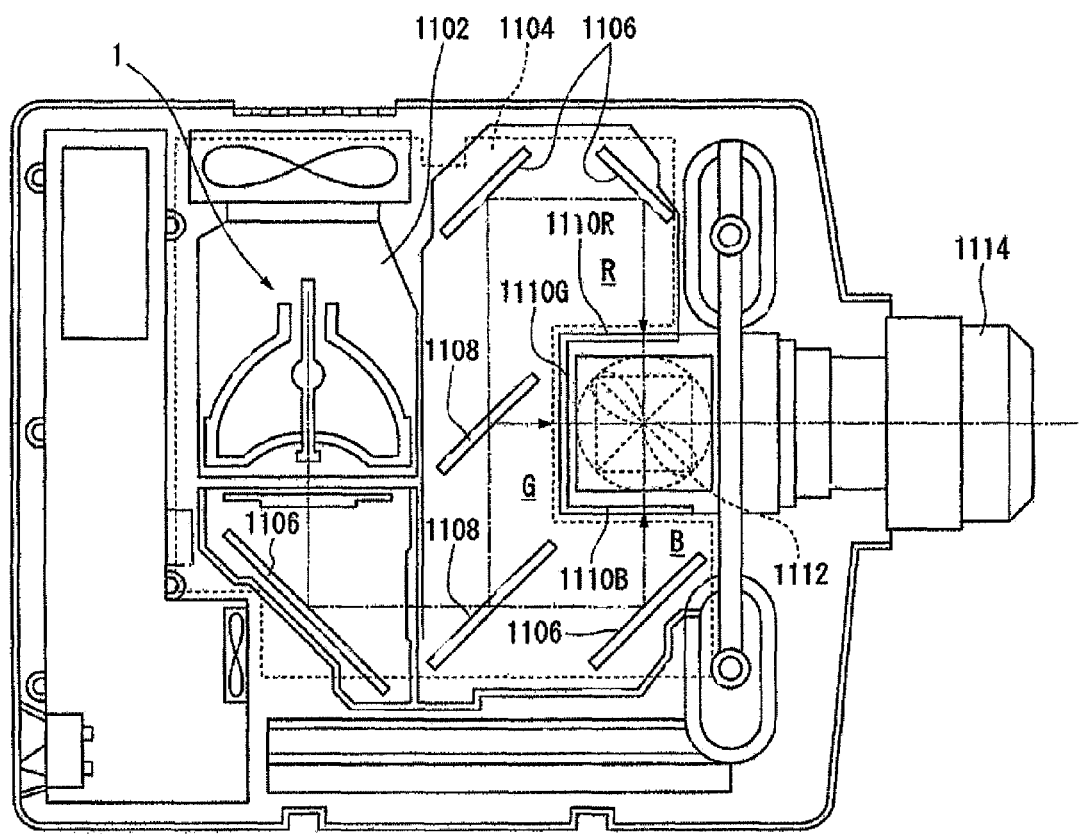
FIG. 3 is a schematic structural view of a projector of an embodiment of the invention.

FIG. 3 is a plan view showing a structural example of the projector. As shown in the drawing, inside a projector 1100 is provided a lamp unit 1102 including the light source device 1 of the embodiment. Projection light emitted from the lamp unit 1102 is split into light rays of three primary colors of red (R), green (G), and blue (B) by four mirrors 1106 and two dichroic mirrors 1108 arranged in a light guide 1104 to be input to respective liquid crystal panels (light modulation sections) 1110R, 1110B, and 1110G as light valves corresponding to the respective primary colors.

The liquid crystal panels 1110R, 1110B, and 1110G have a same structure as that of the liquid crystal device described above and are driven by signals of the primary colors R, G, and B supplied from an image signal processing circuit. Light rays modulated by the liquid crystal panels are input to a dichroic prism 1112 from three directions. In the dichroic prism 1112, light rays of red and blue are refracted at an angle of 90 degrees, whereas a green light ray travels straight. Consequently, images of the respective colors are synthesized, resulting that a color image is projected on a screen or the like via a projection lens 1114 (a projection section). Regarding a display image obtained by each of the liquid crystal panels 1110R, 1110B, and 1110G, the display image by the liquid crystal panel 1110G needs to be laterally reversed with respect to the display image by each of the liquid crystal panels 1110R and 1110B.

The projector 1100 includes the light source device 1 of the above-described embodiment. In the light source device 1, devitrification of the arc tube is prevented in the long term, and thus, application of illumination light with high luminance can be achieved in the long term. Accordingly, the projector 1100 has a long life span and can provide a projection image having high display quality and high reliability. Additionally, the projector 1100 including the compact light source device 1 can be entirely miniaturized and light-weighted.

Furthermore, in the projector 1110 of the embodiment, the liquid crystal panels are used as the light modulation sections. However, instead of the liquid crystal panels, in general, any device that can modulate incident light in accordance with image information can be used as a light modulation section. For example, there may be used a micro-mirror type light modulation device, such as a digital micro-mirror device (DMD, registered as a trademark). If the DMD is used, there are no needs for an incident light polarizing plate or an output light polarizing plate. Thus, no polarization conversion element is necessary.

The light source device 1 of the embodiment is applied to the projector 1100 of a transmissive liquid crystal system. However, instead of that, the light source device 1 can also be applied to a projector employing a reflective liquid crystal system, such as a liquid-crystal-on-silicon (LCOS) system, so as to obtain same advantageous effects.

The light modulation sections of the above embodiment may be structured by a three-plate system using the three liquid crystal panels or by a single plate system using a single liquid crystal panel. If the single plate system is used, it is unnecessary to provide a color split optical system, a color synthesis optical system, and the like for an illumination light system.

In addition, in the embodiment, the light source device 1 is applied to a front-type projector projecting an optical image on a projecting surface arranged outside the projector. However, alternatively, the light source device 1 may be applied to a rear-type projector having a screen thereinside to project an optical image on the screen inside the projector.

While some preferred embodiments of the invention have been described with reference to the accompanying drawings, it should be understood that the invention is not intended to be limited to those embodiments, and for example, the embodiments may be combined together. It will be obvious to those skilled in the art that various changes and modifications can be made therein without departing from the scope of technological ideas described in the claims of the invention, and those changes and modifications are naturally included in the technological range of the invention.

For example, the light source device 1 of the above embodiment can employ a microwave power source or an AC power source.

Additionally, although the light source device 1 of the embodiment is used as the light source for the projector, the compact and light-weighted light source device of the embodiment may also be applied to other optical apparatuses, as well as can be suitably applied to lighting apparatuses of transportation systems such as aircraft, ships, and vehicles, indoor lighting apparatuses, and the like.

What is claimed is:

1. A method for producing a discharge lamp, comprising:
applying a liquid material including boron oxide on an inner surface of an arc tube,
wherein the liquid material is prepared by introducing particles of the boron oxide into a medium and dispersing or dissolving the particles of the boron oxide in the medium; and
heating the applied liquid material to form a film substantially composed of boron oxide on the inner surface of the arc tube.

2. The method according to claim 1, wherein the discharge lamp is one of a halogen lamp, a metal halide lamp, or a high-pressure mercury lamp.

* * * * *